US012312839B2

(12) United States Patent
Baker

(10) Patent No.: US 12,312,839 B2
(45) Date of Patent: May 27, 2025

(54) GATE LATCH ASSEMBLY

(71) Applicant: ASSA ABLOY Americas Residential Inc., New Haven, CT (US)

(72) Inventor: Scott Calvin Baker, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 178 days.

(21) Appl. No.: 17/992,058

(22) Filed: Nov. 22, 2022

(65) Prior Publication Data

US 2023/0167659 A1 Jun. 1, 2023

Related U.S. Application Data

(60) Provisional application No. 63/283,769, filed on Nov. 29, 2021.

(51) Int. Cl.
*E05B 65/00* (2006.01)
*E05B 1/00* (2006.01)
*E05C 3/12* (2006.01)

(52) U.S. Cl.
CPC .......... *E05B 65/0007* (2013.01); *E05B 1/003* (2013.01); *E05C 3/124* (2013.01)

(58) Field of Classification Search
CPC .. E05B 65/0007; E05B 81/003; E05B 63/044; E05B 57/00; E05C 3/124
USPC ........................................................... 292/44
See application file for complete search history.

(56) References Cited

U.S. PATENT DOCUMENTS 4,932,693 A * 6/1990 Schwartz .............. E05F 1/1215 292/228
10,988,963 B2 * 4/2021 Bacon ....................... E06B 9/52
2005/0184532 A1 * 8/2005 Karcz ..................... E05B 63/20 292/163

(Continued)

FOREIGN PATENT DOCUMENTS

CN 110685510 A * 1/2020

OTHER PUBLICATIONS

The Home Depot, Everbilt Slate Grey Modern Door Latch, obtained on Mar. 3, 2023 at: https://www.homedepot.com/p/Everbilt-Slate-Grey-Modern-Door-Lever-Latch-with-Rust-Defender-60194/314531237, 3 pages.

(Continued)

*Primary Examiner* — Kristina R Fulton
*Assistant Examiner* — James Edward Ignaczewski
(74) *Attorney, Agent, or Firm* — Merchant & Gould P.C.

(57) ABSTRACT

A latch assembly includes a rose, a handle rotatably coupled to the rose and rotatable around a rotation axis, and a latch. A biasing member is disposed within the rose and engaged with the latch. The biasing member being selectively connectable to the rose. When the biasing member is connected to the rose, the latch is pivotable around the rotation axis between a latched position and an unlatched position via the handle. The latch biased towards the latched position. When the biasing member is disconnected from the rose, the handle and the latch are rotatable together around the rotation axis between at least a left-handed configuration and a right-handed configuration. The biasing member connecting to the rose to secure the handle and the latch in either the left-handed configuration or the right-handed configuration.

19 Claims, 10 Drawing Sheets

(56) References Cited

U.S. PATENT DOCUMENTS

| | | | | |
|---|---|---|---|---|
| 2005/0225098 | A1* | 10/2005 | Kliefoth | E05C 19/163 292/251.5 |
| 2013/0099509 | A1* | 4/2013 | Hansen, II | E05B 63/0056 292/197 |
| 2022/0081932 | A1* | 3/2022 | Varadaraju | E05B 1/003 |
| 2022/0112744 | A1* | 4/2022 | Wheatland | E05C 1/004 |
| 2023/0040016 | A1* | 2/2023 | Lajewardi | E05C 3/004 |
| 2023/0074741 | A1* | 3/2023 | Seykora | E05B 9/02 |

OTHER PUBLICATIONS

360 Yardware, Oval Contemporary Lever Gate Latch, obtained on Mar. 3, 2023 at: https://shop.360yardware.com/oval-contemporary-lever-gate-latch-build-your-own-package-oval.htm, 2 pages.

* cited by examiner

GATE LATCH ASSEMBLY

CROSS-REFERENCE TO RELATED APPLICATIONS

This application claims priority to and the benefit of U.S. Provisional Application No. 63/283,769, filed Nov. 29, 2021, and that is incorporated by reference in its entirety.

BACKGROUND

When considering a latch for a hinged barrier for a passageway (e.g., a door, gate, etc.), users have traditionally had to consider the handing of the barrier before choosing a latch. Handing of a barrier refers to the side of the barrier where the hinge is positioned with respect to the user (e.g., a left-handed barrier or a right-handed barrier). Handing has had to be considered because latch hardware is typically provided in either a left-handed configuration or an opposite right-handed configuration. Therefore, the user must make a decision when acquiring latch hardware, often leading to confusion and frustration. In other known examples, the latch may be able to switch between the left-handed configuration and the right-handed configuration, however, in order to make this switch the latch often needs to be almost completely disassembled by the user and then reassembled. Accordingly, improvements are desired.

SUMMARY

The present disclosure relates generally to barrier latches. In one possible configuration, and by non-limiting example, a gate latch assembly that includes a field-handable handle and latch without substantial disassembly of the latch assembly is disclosed.

In an aspect, the technology relates to a latch assembly including: a rose; a handle rotatably coupled to the rose and rotatable around a rotation axis; a latch including a first end and an opposite second end, the first end disposed within the rose and coupled to the handle, and the second end extending outwards from the rose; and at least one biasing member disposed within the rose and engaged with the first end of the latch, the at least one biasing member selectively connectable to the rose, wherein when the at least one biasing member is connected to the rose, the latch is pivotable around the rotation axis between a latched position and an unlatched position via the handle, the latch being biased towards the latched position, and wherein when the at least one biasing member is disconnected from the rose, the handle and the latch are rotatable together around the rotation axis between at least a left-handed configuration and a right-handed configuration, the at least one biasing member connecting to the rose to secure the handle and the latch in either the left-handed configuration or the right-handed configuration.

In an example, the at least biasing member is rotatable around the rotation axis when disconnected from the rose. In another example, a support is removably coupled to the rose, the at least one biasing member selectively connecting to the rose via the support. In yet another example, the rose defines a pair of opposing openings each corresponding to the left- and right-handed configuration of the latch such that the latch extends therethrough, and the respective opening at least partially defines the latched position and the unlatched position of the latch. In still another example, the rose includes a first body and a second body, the first body and the second body removably coupled together.

In another aspect, the technology relates to a latch assembly including: a spindle rotatable around a rotation axis; an interior assembly includes: an interior rose defining two opposing openings and including a first body and a second body; a handedness support disposed within the interior rose; an interior handle mounted to the first body and rotatable around the rotation axis, the interior handle coupled to the spindle; a latch having a first end and an opposite second end, the first end disposed within the interior rose and coupled to the interior handle, and the second end extending outwards from the interior rose; and at least one interior biasing member disposed within the interior rose and engaged with the first end of the latch, wherein the at least one interior biasing member is selectively connectable to the handedness support, wherein when the at least one interior biasing member is connected to the handedness support, the latch extends through one of the two opposing openings and is pivotable around the rotation axis between a latched position and an unlatched position at least partially defined by the opening, the latch being biased towards the latched position, and wherein when the at least one interior biasing member is disconnected from the handedness support and the second body is removed from the first body, the interior handle and the latch are rotatable together around the rotation axis between at least a left-handed configuration and a right-handed configuration, the at least one interior biasing member connecting to the handedness support to secure the interior handle and the latch in either the left-handed configuration or the right-handed configuration; and an exterior assembly including: an exterior rose; an exterior handle mounted to the exterior rose and rotatable around the rotation axis, the exterior handle coupled to the spindle, wherein both the interior handle and the exterior handle drive movement of the latch between the latched position and the unlatched position.

In an example, the exterior assembly further includes: a positioning plate disposed within the exterior rose and coupled to the exterior handle; and at least one exterior biasing member disposed within the exterior rose and engaged to the positioning plate, wherein the at least one exterior biasing member is selectively connectable to the exterior rose, wherein when the at least one exterior biasing member is connected to the exterior rose, the positioning plate is pivotable around the rotation axis between a first position and a second position, the positioning plate being biased towards the first position, and wherein when the at least one exterior biasing member is disconnected from the exterior rose, the exterior handle and the positioning plate are rotatable together around the rotation axis between at least a left-handed configuration and a right-handed configuration, the at least one exterior biasing member connecting to the exterior rose to secure the exterior handle and the positioning plate in either the left-handed configuration or the right-handed configuration. In an example, the first position and the second position of the positioning plate correspond to the latched position and the unlatched position, respectively, of the latch. In yet another example, the first position is defined by at least one shoulder formed by the exterior rose and the second position is defined by a repositionable plate support coupled to the exterior rose. In still another example, the pivoting movement of the positioning plate between the first and second positions occurs on a same plane as that of the rotational movement of the positioning plate between the left- and right-handed configurations. In an example, the pivoting movement of the latch between the latched and unlatched positions occurs on a same plane as that of the rotational movement of the latch between the left- and right-handed configurations.

In another example, the handedness support extends through the plane of movement of the latch. In yet another example, the at least one interior biasing member includes a pair of tension springs, a first of the pair of tension springs coupled between the latch and the handedness support in the left-handed configuration and a second of the pair of tension springs coupled between the latch and the handedness support in the right-handed configuration. In still another example, the left-handed configuration is approximately 180° from the right-handed configuration. In an example, when the at least one interior biasing member is disconnected from the handedness support and the second body is removed from the first body, the interior handle and the latch are freely rotatable together around the rotation axis. In another example, a receiving mechanism is configured to engage the second end of the latch when the latch is in the latched position.

In another aspect, the technology relates to a method of handing a latch assembly including: providing a latch assembly including: a rose; a handle rotatably coupled to the rose and rotatable around a rotation axis; a latch including a first end and an opposite second end, the first end disposed within the rose and coupled to the handle, and the second end extending outwards from the rose; and at least one biasing member disposed within the rose and coupled between the latch and the rose, wherein the latch is pivotable around the rotation axis between a latched position and an unlatched position via the handle, the latch being biased towards the latched position; disconnecting the at least one biasing member from the rose such that the handle and the latch are rotatable together around the rotation axis between at least a left-handed configuration and a right-handed configuration; setting the handed configuration of the handle and the latch; and connecting the at least one biasing member to the rose.

In an example, disconnecting the at least one biasing member from the rose includes removing a fastener that connects the at least one biasing member to the rose. In another example, disconnecting the at least one biasing member from the rose includes removing a first body of the rose from a second body of the rose. In yet another example, the rose, the handle, the latch, and the at least one biasing member are included in an interior assembly, the method further including: providing an exterior assembly couplable to the interior assembly by a spindle, the exterior assembly including: an exterior rose; and an exterior handle; and setting a handed configuration of the exterior assembly to match the interior assembly.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
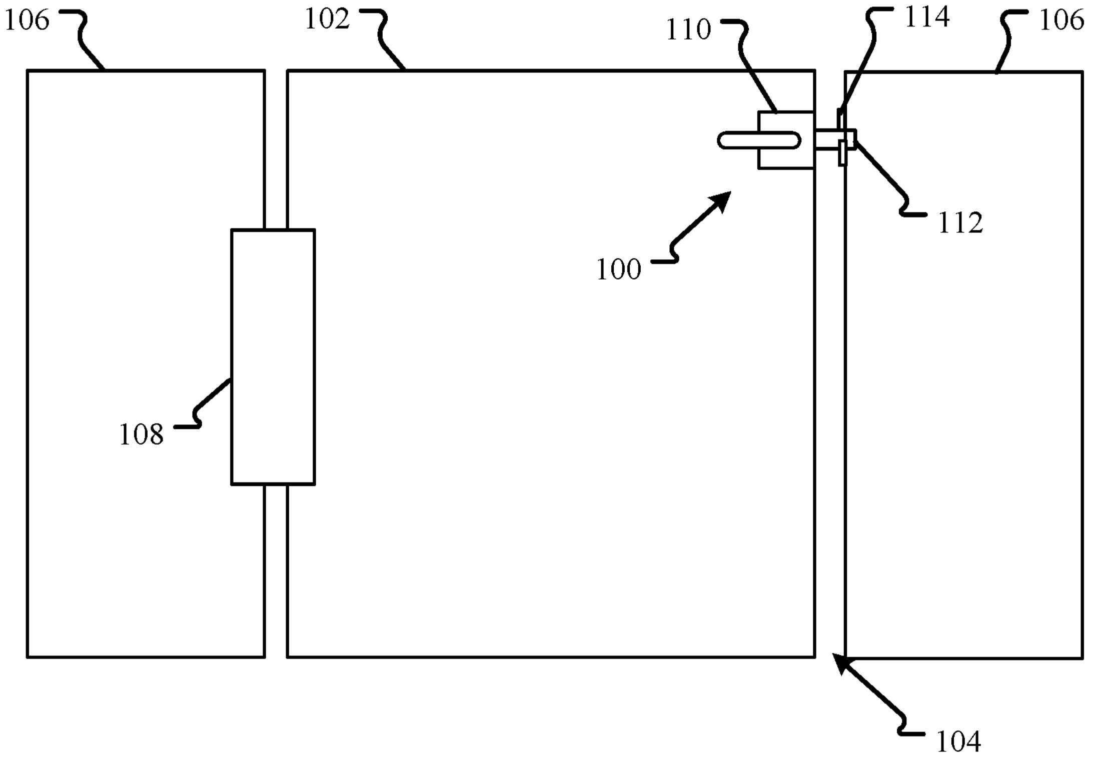
FIG. 1 is a front view of a latch assembly mounted to a gate in a latched position and in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A latch assembly is disclosed herein with enhanced installation features. The latch assembly includes an interior assembly and an exterior assembly that can both be set to either a left-handed configuration or a right-handed configuration without completely disassembling the components. For example, the interior assembly can be changed between the left- and right-handed configuration without removing its handle or latch, while the exterior assembly can be changed without removing its handle. Accordingly, the latch assembly provides a simplified and more efficient handing process by only needing a biasing element to be disconnected.

Additionally, both the interior assembly and the exterior assembly have similar components so that the same or similar process to change handedness can be utilized. Further, with similar components, both the interior assembly and the exterior assembly corporate to drive operation of the latch assembly. For example, both assemblies have biasing members so as to bias the latch in a latched position. Both assemblies have handles that can be used to operate the latch, and both assemblies have stop features so as to define the latched position and an unlatched position of the latch assembly.

The latch assembly disclosed herein is configured to be mounted to a gate and used with a gate. However, it is considered within the scope of the present disclosure, that the latch assembly can be used in connection with any barrier that, when in a closed position, at least partially obstructs an opening (e.g., a door, a window, etc.). The latch assembly disclosed herein can be utilized in a variety of different applications. For example, the latch assembly can be used on a gate positioned within a fence in a residential environment, such as on a backyard gate of a home with a fenced-in backyard. The latch assembly is configured to have the handle and latch mounted to the interior of the gate and, at the exterior of the gate, a corresponding handle for operation of the latch.

FIG. 1 is a front view of a latch assembly 100 mounted to a gate 102 in a latched position. The gate 102 is positioned within a passageway 104 in a fence 106 and includes a hinge 108 connected to the fence 106 so that the gate 102 is selectively positionable to block the passageway 104. The latch assembly 100 is disposed on the opposite side of the gate 102 from the hinge 108 and includes at least an interior assembly 110 mounted on the gate 102 with a latch 112 extending therefrom. The latch 112 may also be referred to as a locking plate. In the latched position, the latch 112 is engaged with a receiving mechanism 114 that is mounted on the fence 106 as so as to keep the gate 102 closed.

Figure 2:
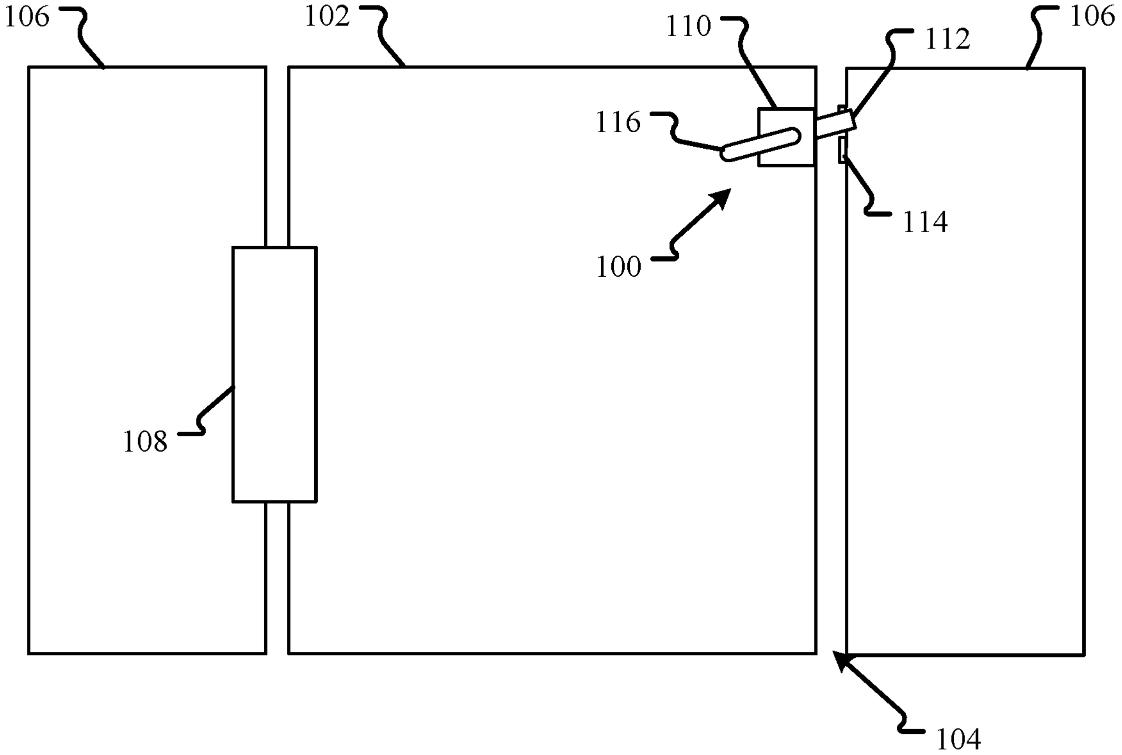
FIG. 2 is another front view of the latch assembly of FIG. 1 mounted to the gate in an unlatched position.

FIG. 2 is another front view of the latch assembly 100 mounted to the gate 102 in an unlatched position. Certain components are described above, and thus, are not necessarily described further. The interior assembly 110 includes a handle 116 that is utilized to move the latch 112 between the latched position (shown in FIG. 1) and the unlatched position. In the unlatched position, the latch 112 disengages with the receiving mechanism 114 and so that a user may open the gate 102 as required or desired.

Referring concurrently to FIGS. 1 and 2, the latch assembly 100 can be handed in either right-handed or left-handed configurations. For example, the latch assembly 100 may be considered to be in a left-handed configuration as illustrated in FIGS. 1 and 2 because the latch 112 extends from the right side of the interior assembly 110 when looking straight at the gate 102. When handed in the opposite configuration then what is shown in FIGS. 1 and 2 (e.g., the latch 112 extending from the left side), the hinge 108 is positioned on the opposite side of the gate 102 and the rotation of the handle 116 for moving the latch 112 between the latched and unlatched positions occurs in the opposite direction.

In some examples, the interior assembly 110 is mounted to an inside of the gate 102. Accordingly, the receiving mechanism 114 can be mounted to, or within a gate jamb. In some examples, the gate jamb is a post or other portion of the fence 106 or other barrier adjacent the gate 102. The term "outside" is broadly used to mean an area outside the gate 102, and "inside" is broadly used to denote an area inside the gate 102. In some examples, from the outside of the gate 102, the latch assembly 100 may include an exterior assembly 118 (shown in FIG. 3) that is also configured to drive operation of the latch 112. Additionally, in some examples, a key (not shown) may be required to operate the exterior assembly. In some examples, the interior assembly 110 can be mounted to the gate jamb and the receiving mechanism 114 can be mounted to the gate 102 as required or desired.

Figure 3:
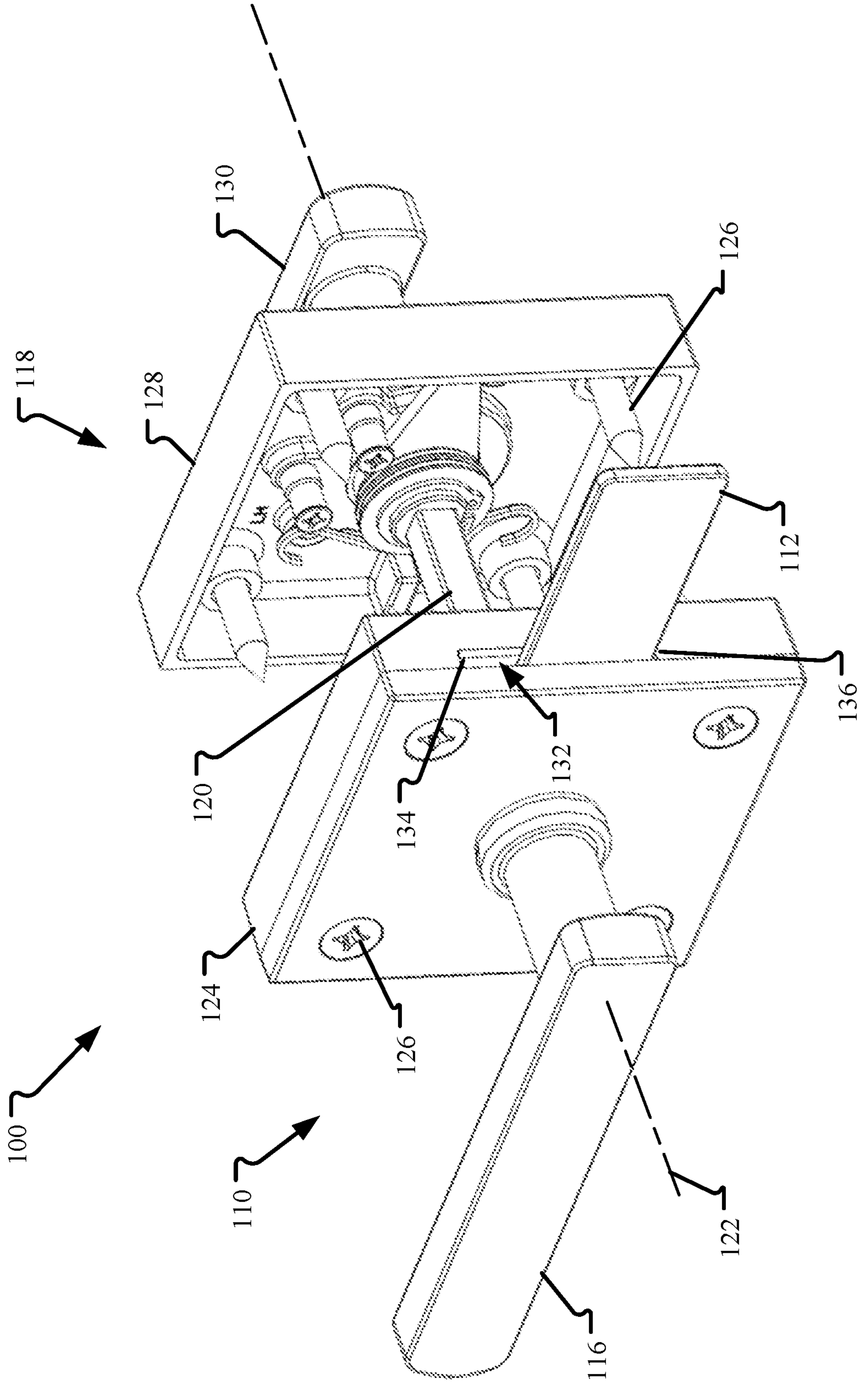
FIG. 3 is a perspective view of the latch assembly of FIG. 1.
Figure 4:
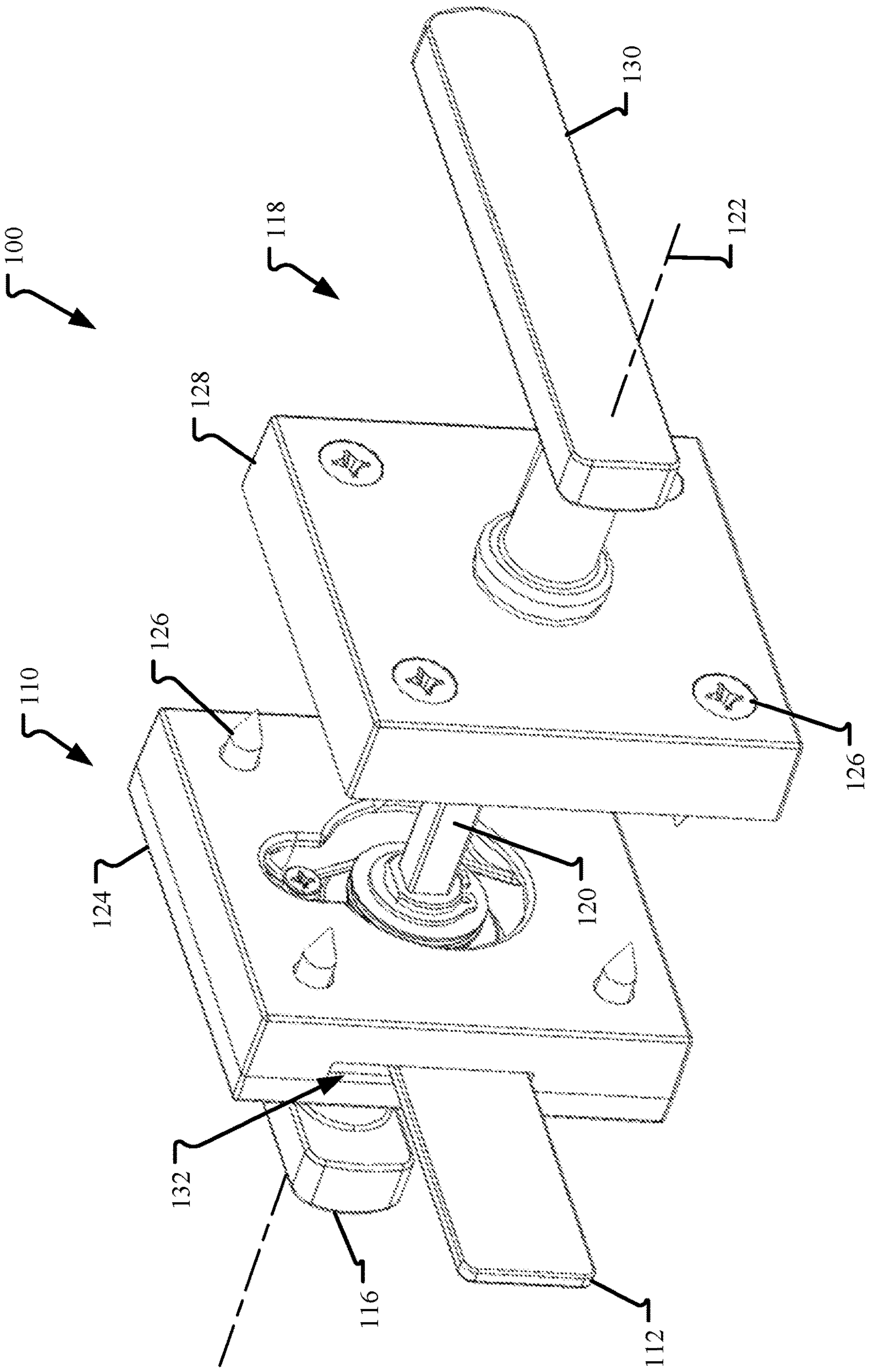
FIG. 4 is another perspective view of the latch assembly of FIG. 1.

FIG. 3 is a perspective view of the latch assembly 100. FIG. 4 is another perspective view of the latch assembly 100. Referring concurrently to FIGS. 3 and 4, the latch assembly 100 includes the interior assembly 110 and the exterior assembly 118 coupled together via a spindle 120 that is rotatable around a rotation axis 122. When the latch assembly 100 is installed on the gate 102 (shown in FIGS. 1 and 2), the spindle 120 extends through a bore within the gate. In an aspect, the spindle 120 may have a square shaped cross-section.

The interior assembly 110 includes an interior rose 124 that is configured to mount to the interior surface of the gate 102 via one or more fasteners 126 (e.g., screws). An interior handle 116 is rotatably supported by the interior rose 124 and couples to the spindle 120 such that the interior handle 116 is rotatable around the rotation axis 122. The latch 112 is also coupled to the interior handle 116 and the spindle 120 such that the latch 112 can pivot around the rotation axis 122 between the latched position and the unlatched position. The latched position of the latch 112 is illustrated in FIGS. 3 and 4.

The exterior assembly 118 includes an exterior rose 128 that is configured to mount to the exterior surface of the gate 102 via one or more fasteners 126. An exterior handle 130 is rotatably supported by the exterior rose 128 and couples to the spindle 120 such that the exterior handle 130 is rotatable around the rotation axis 122.

In operation, both the interior handle 116 and the exterior handle 130 are configured to drive the movement of the latch 112 between the latched position and the unlatched position. The exterior handle 130 uses the spindle 120 to drive the movement of the latch 112. In the example, the interior handle 116 and the exterior handle 130 are coupled through the spindle 120 such that both handles 116, 130 rotate together around the rotation axis 122 and movement of one results in corresponding movement of the other.

The interior rose 124 defines an opening 132 on a side that the latch 112 extends through. A top wall 134 of the opening 132 at least partially defines the unlatched position of the latch 112 and forms a rotation stop for the latch 112. A bottom wall 136 of the opening 132 at least partially defines the latched position of the latch 112 and forms another rotation stop for the latch 112. The opening 132 is defined on both the left and right side of the interior rose 124 so as to accommodate different handing configurations.

Figure 5:
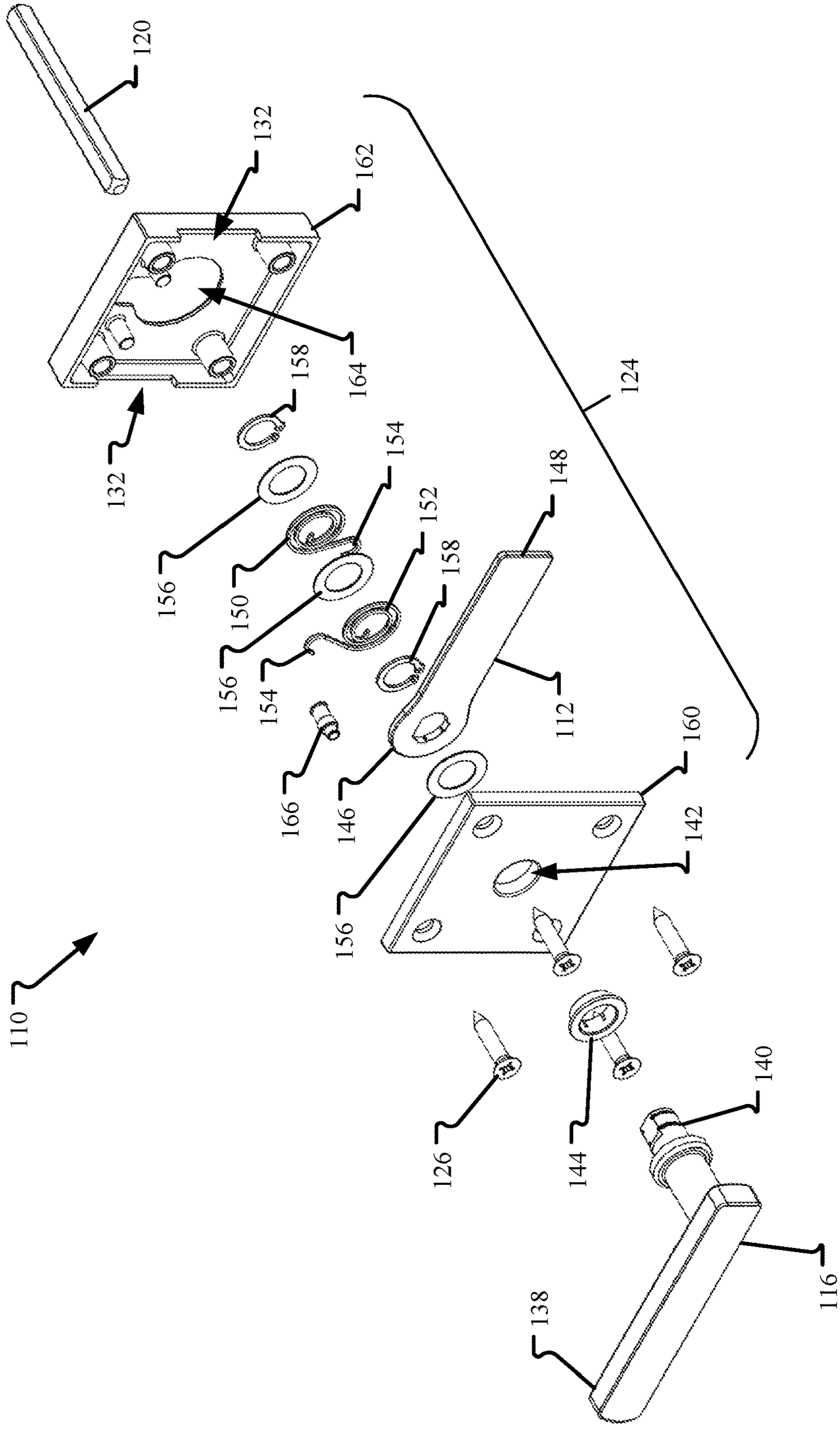
FIG. 5 is an exploded perspective view of an interior assembly of the latch assembly of FIG. 1.

FIG. 5 is an exploded perspective view of the interior assembly 110 of the latch assembly 100 (shown in FIGS. 3 and 4). The interior handle 116 includes a lever 138 and a spindle receiver 140. The spindle receiver 140 is configured to receive the spindle 120 and rotatably mount to the interior rose 124. In the example, the spindle receiver 140 extends through a center aperture 142 of the interior rose 124 and rotatably mounts via a bushing 144. The latch 112 includes a first end 146 and an opposite second end 148. The first end 146 is disposed within the interior rose 124 and couples to the spindle receiver 140 of the interior handle 116. The second end 148 is configured to extend outwards from the interior rose 124 and selectively engage with the receiving mechanism 114 (shown in FIGS. 1 and 2).

A first biasing member 150 and a second biasing member 152 are also coupled to the spindle receiver 140 of the interior handle 116 and disposed within the interior rose 124. The biasing members 150, 152 are configured to engage with the first end 146 of the latch 112. In the example, the biasing members 150, 152 are tension springs with a free end 154 that is configured to selectively engage with the interior rose 124. In other examples, the biasing member 150, 152 can be any other type of resilient/spring member that enables the latch assembly to function as described herein. In an aspect, the two biasing members 150, 152 may be a single integrated component as required or desired. The biasing member 150, 152 when engaged with the interior rose 124 is configured to at least partially secure the interior handle 116 and the latch 112 in their respective handedness configuration. Additionally, the biasing member 150, 152 provides the biasing force for the interior handle 116 and the latch 112 to return to the latched position from the unlatched position. In the example, the biasing members 150, 152 are spaced apart by washers 156 and the entire assembly is secured to the spindle receiver 140 by one or more clips 158, such that the interior handle 116, the latch 112, and the biasing members 150, 152 are all fixed to one another for rotation around the rotation axis 122 (shown in FIGS. 3 and 4). A washer 156 may also be disposed between the latch 112 and the interior rose 124.

In the example, the interior rose 124 is formed from a first body 160 and a second body 162 (e.g., a backplate) that are removably coupled together. The outside surface of the second body 162 is configured to be mounted against the gate surface and the fasteners 126 are used to secure the interior rose 124 and the entire interior assembly 110 to the gate. In an example, the first body 160 and the second body 162 can include corresponding features so that the two bodies 160, 162 can be aligned with one another for installation. In other examples, separate screws or snap features may be used to coupled the two bodies together as required or desired. The first body 160 includes the aperture 142 so that the interior handle 116 can be mounted thereto. The second body 162 also includes an aperture 164 so that the spindle 120 can extend into the interior rose 124.

The interior rose 124 also include a handedness support 166. The handedness support 166 extends within the interior rose 124 and is configured to selectively engage with the free end 154 of one of the biasing members 150, 152. In the example, the handedness support 166 is a fastener that couples to the first body 160 and can be removed and reattached as required or desired. In an example, the fastener is a bolt-type component. In an aspect, the aperture 164 of the second body 162 may be configured to encompass the location of the handedness support 166 so that the handedness support 166 is accessible from outside of the interior rose 124 without decoupling the two bodies 160, 162. The opening 132 is defined between the first body 160 and the second body 162 and so that the second end 148 of the latch 112 can protrude from the interior rose 124. In the example, the interior rose 124 has two opposing openings 132, one on each side, so that the latch 112 can protrude out from either the left-handed configuration or the right-handed configuration.

Figure 6:
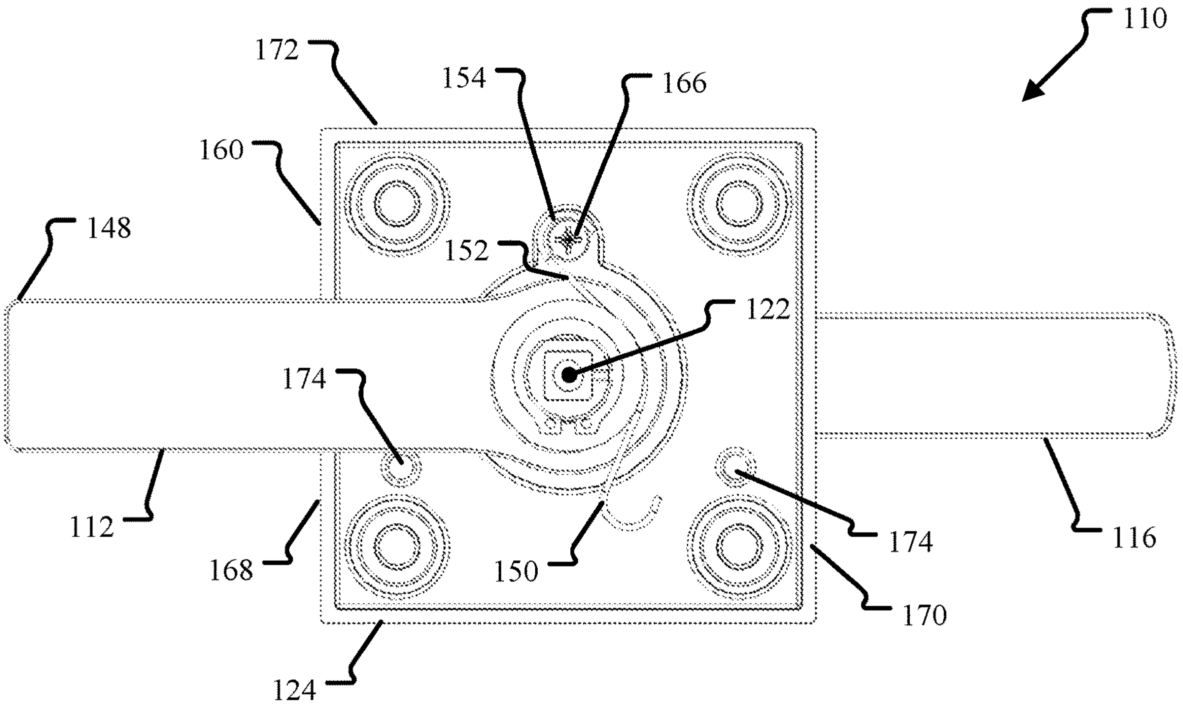
FIG. 6 is an interior view of the interior assembly of FIG. 5 in a connected right-handed configuration.

FIG. 6 is an interior view of the interior assembly 110 in a connected right-handed configuration. In FIG. 6, the second body 162 (shown in FIG. 5) of the interior rose 124 is removed for clarity. In the connected right-handed configuration, the latch 112 extends from a right side 168 of the first body 160, while the interior handle 116 projects from a left side 170. The right and left directions being in the direction of facing the exterior of the rose and looking at the handle. This configuration allows for the interior assembly 110 to be positioned on the left side of the receiving mechanism 114 (shown in FIGS. 1 and 2) for engagement therewith. As illustrated in FIG. 6, the free end 154 of the biasing member 152 is connected to the interior rose 124 via the handedness support 166 that is coupled to the first body 160.

When the biasing member 152 is connected to the interior rose 124, the latch 112 is pivotable around the rotation axis 122 (extending in and out of the page) via user operation of the interior handle 116 between the latched position (as illustrated) and an unlatched position. In the unlatched position, the second end 148 of the latch 112 pivots towards a top side 172 of the first body 160 from the latched position (e.g., a clockwise direction as illustrated in FIG. 6). The biasing member 152 biases the latch 112 towards the latched position so that when the interior handle 116 is released, the latch 112 will automatically return to its horizontal latched position as illustrated (e.g., a counter-clockwise direction as illustrated in FIG. 6). In the example, the other biasing member 150 is not connected to the interior rose 124.

In the example, the upper and lower pivoting limits, and thereby, the latched and unlatched positions of the latch 112 are at least partially defined by the opening 132 (shown in FIGS. 3 and 4 and its top and bottom walls) that the latch 112 extends through in the interior rose 124. In an aspect, the latched position of the latch 112 may further be defined by a projection 174 that extends within the interior rose 124. The projection 174 may extend from the first body 160 and at least a portion of the projection 174 is disposed within a plane of the path of travel of the latch 112 as it pivots around the rotation axis 122. This plane that the latch 112 rotates within may be orthogonal to the rotation axis 122. As such, the latch 112 cannot move past the projection 174 in the counter-clockwise direction. For the top side of the latch 112, the handedness support 166 extends within the plane of the path of travel of the latch 112 so that the latch 112 cannot rotate past the handedness support 166 in the clockwise direction. However, in an aspect, the opening 132 may prevent the latch 112 from reaching the handedness support 166 when the interior rose 124 is coupled together.

As described herein, the latch 112 and the interior handle 116 are directly coupled together for rotation around the rotation axis 122. As such, rotational movement of one corresponds directly to rotational movement of the other. Additionally, when the second body 162 is attached, the biasing members 150, 152 and the first end of the latch 112 are all disposed within an internal cavity of the interior rose 124.

Figure 7:
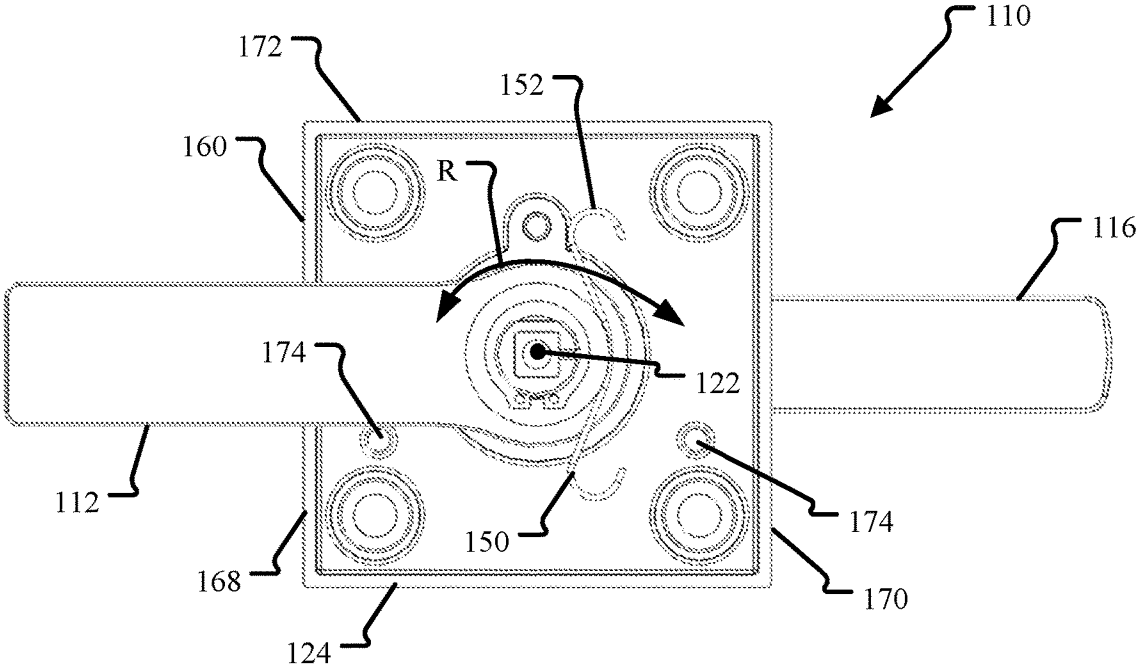
FIG. 7 is an interior view of the interior assembly of FIG. 5 in a disconnected right-handed configuration.

FIG. 7 is an interior view of the interior assembly 110 in a disconnected right-handed configuration. In FIG. 7, the second body 162 (shown in FIG. 5) of the interior rose 124 is removed for clarity, additionally, certain components are described above and not necessarily described further. From the connected right-handed configuration described above in FIG. 6, if the user requires or desires the latch 112 to be positioned and extending from the left side 170 and in a left-handed configuration, the interior assembly 110 is configured for such a change and without substantial disassembly of the latch 112 and handle 116 components. First, once the second body 162 is removed, the biasing member 152 is disconnected from the handedness support 166 (shown in FIG. 6) and the interior rose 124. In the example, the handedness support 166 is completely removed from the first body 160. Once the biasing member 152 is disconnected, the handle 116, the latch 112, and the biasing members 150, 152 assembly are freely rotatable around the rotation axis 122. However, this assembly is still mounted to the first body 160 such that complete disassembly is not needed.

In the example, both biasing members 150, 152 are rotatable around the rotation axis 122 when one is not engaged with the interior rose 124. Additionally, once the handedness support 166 is removed from the plane of the path of travel of the latch 112 and the fasteners 126 (shown in FIGS. 3 and 4) that are used to install the interior assembly 110 on the gate are removed, the latch 112 is freely rotatable relative to the first body 160. In an aspect, disconnecting the biasing member 150 does not axially move the latch 112 along the rotation axis 122. As such, the plane (e.g., the plane that the latch 112 is disposed within and orthogonal to the rotational axis) that the latch 112 pivots in between the latched and unlatched positions is the same plane that the latch 112 can rotate in for movement between the left- and right-handed configurations. This also simplifies and makes more efficient the steps required to change the handing configuration of the interior assembly 110.

The first body 160 has two projections 174 that extend within the rotation plane of the latch 112. As such, from the right-handed configuration illustrated in FIG. 7, the latch 112 can only rotate towards the top side 172 of the interior rose 124 until the projection 174 adjacent the left side 170 is reached (e.g., in a clockwise direction as illustrated in FIG. 7). However, if the projections 174 are not present, the latch 112 and handle 116 assembly would be able to freely rotate 360° around the rotation axis 122.

Figure 8:
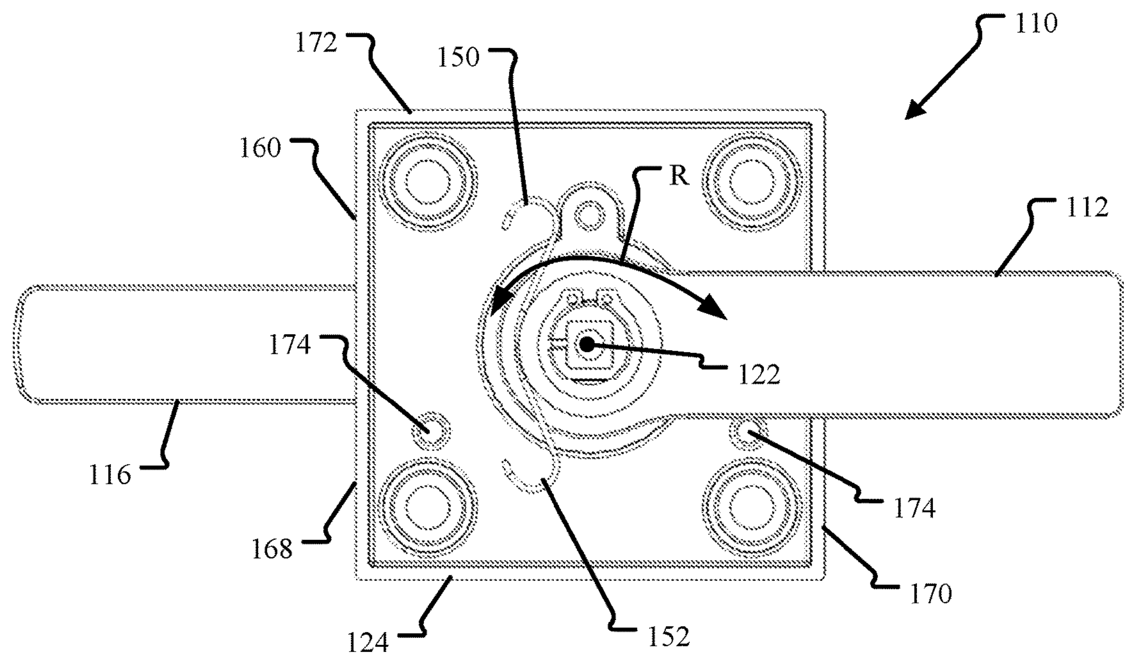
FIG. 8 is an interior view of the interior assembly of FIG. 5 in a disconnected left-handed configuration.

Turning to FIG. 8, it is an interior view of the interior assembly 110 in a disconnected left-handed configuration. In FIG. 8, the second body 162 (shown in FIG. 5) of the interior rose 124 is removed for clarity, additionally, certain components are described above and not necessarily described further. From the disconnected right-handed configuration described above in FIG. 7, the disconnection of the biasing members 150, 152 and the removal of the handedness support 166 (shown in FIG. 6) enables the latch 112, the interior handle 116, and the biasing members 150, 152 to rotate around the rotation axis 122 towards the right-handed configuration (e.g., in a clockwise direction as illustrated in FIG. 8). Thus, the disconnected left-handed configuration allows this assembly to be oriented approximately 180° from the right-handed configuration. In the left-handed configuration, the latch 112 extends from left side 170 of the first body 160, while the interior handle 116 projects from the right side 168. This configuration allows for the interior assembly 110 to be positioned on the right side of the receiving mechanism 114 (shown in FIGS. 1 and 2) for engagement therewith. As illustrated in FIG. 8, the projection 174 extends through the rotation plane of the latch 112 so that the latch 112 may not be completely rotatable the entire way around the rotation axis 122. In order to move the latch 112 and handle 116 assembly back to the right-handed configuration from the left-handed configuration, the user can merely rotate this assembly around the rotation axis 122 and in a counter-clockwise direction.

Figure 9:
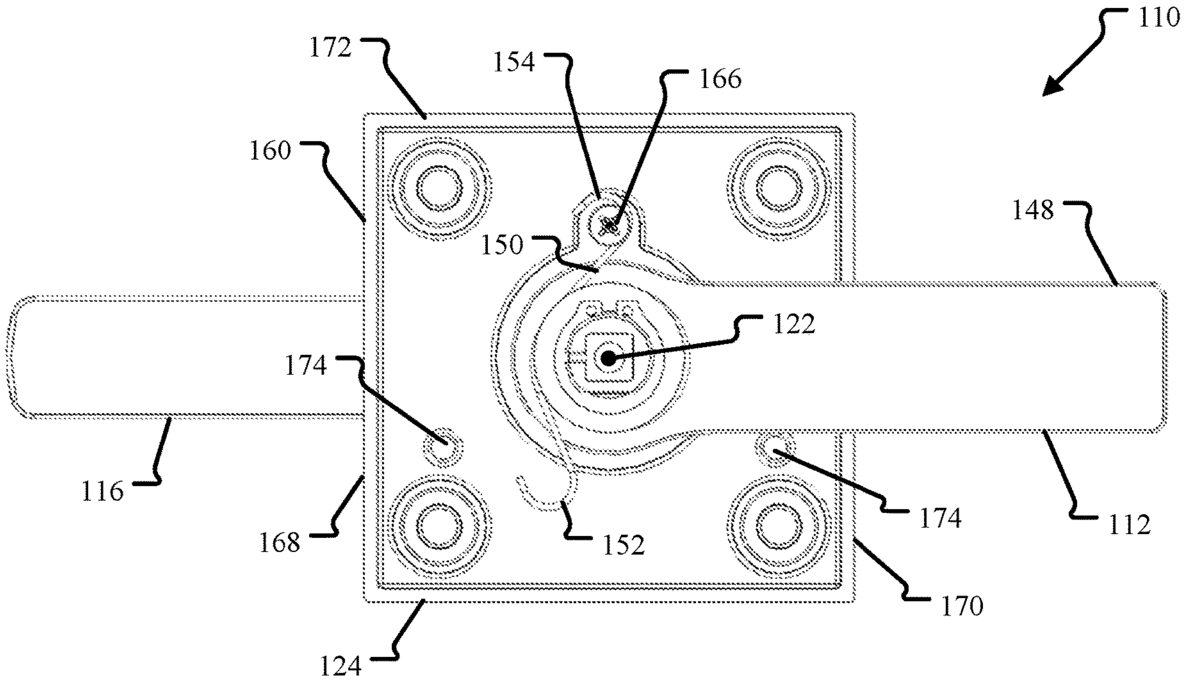
FIG. 9 is an interior view of the interior assembly of FIG. 5 in a connected left-handed configuration.

FIG. 9 is an interior view of the interior assembly 110 in a connected left-handed configuration. In FIG. 9, the second body 162 (shown in FIG. 5) of the interior rose 124 is removed for clarity. In the connected left-handed configuration, the latch 112 extends from the left side 170 of the first body 160, while the interior handle 116 projects from the right side 168 and this position is secured via the biasing member 150 connecting to the interior rose 124. As illustrated in FIG. 9, the free end 154 of the biasing member 150 is connected to the interior rose 124 via the handedness support 166 that is coupled to the first body 160. In both the left-handed configuration and the right-handed configuration (described above), the location of the handedness support 166 is the same with respect to the interior rose 124.

When the biasing member 150 is connected to the interior rose 124, the latch 112 is pivotable around the rotation axis 122 (extending in and out of the page) via user operation of the interior handle 116 between the latched position (as illustrated) and the unlatched position. In the unlatched position, the second end 148 of the latch 112 pivots towards the top side 172 of the first body 160 from the latched position (e.g., in a counter-clockwise direction as illustrated in FIG. 9). The biasing member 150 biases the latch 112 towards the latched position so that when the interior handle 116 is released, the latch 112 will automatically return to its horizontal latched position as illustrated. In the example, the other biasing member 152 is not connected to the interior rose 124.

In the example, the upper and lower pivoting limits, and thereby, the latched and unlatched positions of the latch 112 are at least partially defined by the opening 132 (shown in FIGS. 3 and 4 and its top and bottom walls) that the latch 112 extends through in the interior rose 124. In an aspect, the latched position of the latch 112 may further be defined by the projection 174 that extends within the interior rose 124. The projection 174 may extend from the first body 160 and at least a portion of the projection 174 is disposed within a plane of the path of travel of the latch 112 as it pivots around the rotation axis 122. This plane that the latch 112 rotates within may be orthogonal to the rotation axis 122. As such, the latch 112 cannot move past the projection 174 in the clockwise direction. For the top side of the latch 112, the handedness support 166 extends within the plane of the path of travel of the latch 112 so that the latch 112 cannot rotate past the handedness support 166 in the counter-clockwise direction. However, in an aspect, the opening 132 may prevent the latch 112 from reaching the handedness support 166 when the interior rose 124 is coupled together.

Figure 10:
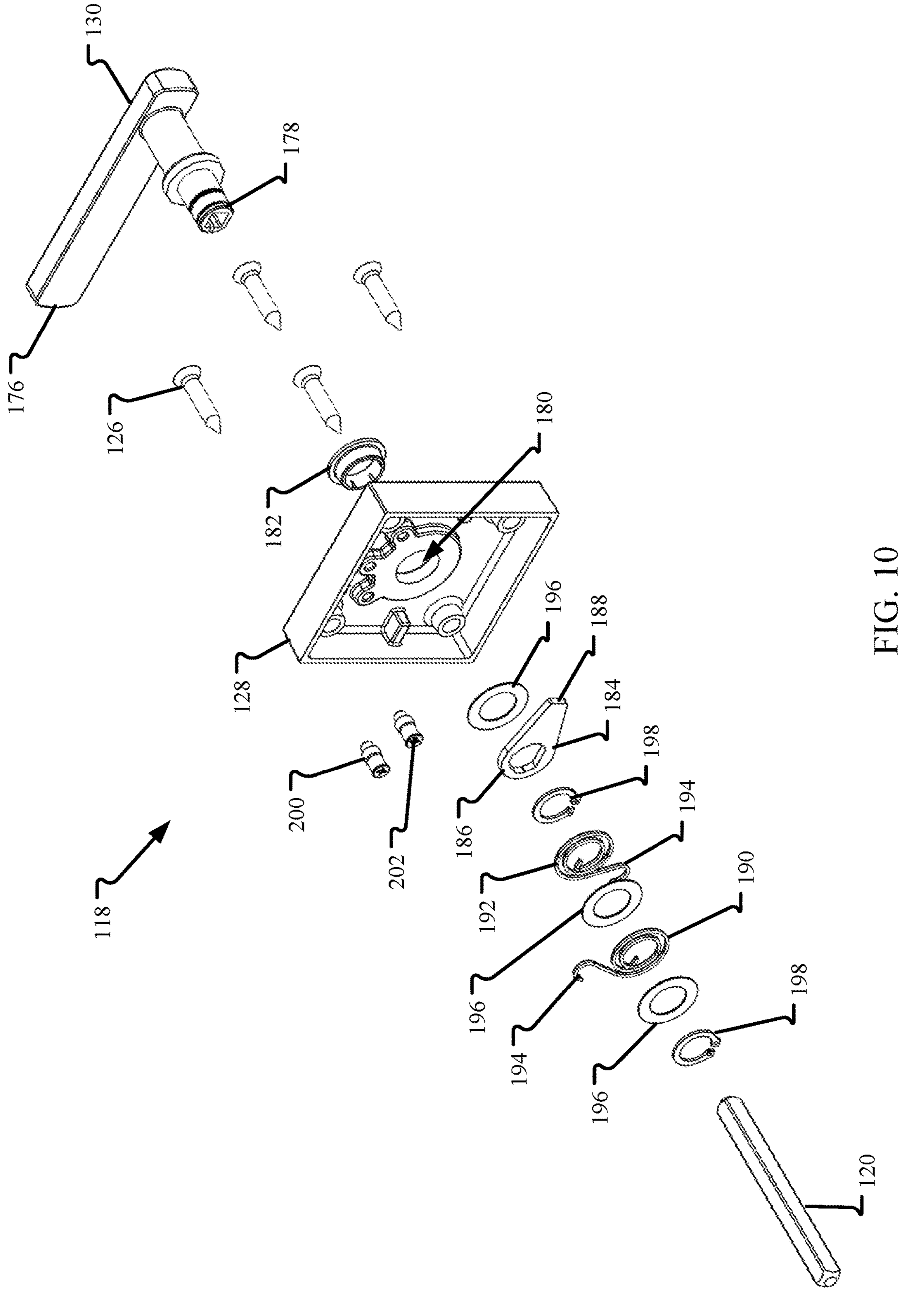
FIG. 10 is an exploded perspective view of an exterior assembly of the latch assembly of FIG. 1.

FIG. 10 is an exploded perspective view of the exterior assembly 118 of the latch assembly 100 (shown in FIGS. 3 and 4). The exterior handle 130 includes a lever 176 and a spindle receiver 178. The spindle receiver 178 is configured to receive the spindle 120 and rotatably mount to the exterior rose 128. In the example, the spindle receiver 178 extends through a center aperture 180 of the exterior rose 128 and rotatably mounts via a bushing 182. The exterior assembly 118 also includes a positioning plate 184 disposed within the exterior rose 128. The positioning plate 184 is also known as a stop plate. The positioning plate 184 includes a first end 186 and an opposite second end 188. The first end 186 couples to the spindle receiver 178 of the exterior handle 130. The second end 188 is configured to extend outwards but still be positioned within the exterior rose 128.

A first biasing member 190 and a second biasing member 192 are also coupled to the spindle receiver 178 of the exterior handle 130 and disposed within the exterior rose 128. The biasing members 190, 192 are configured to engage with the first end 186 of the positioning plate 184. In the example, the biasing members 190, 192 are tension springs with a free end 194 that is configured to selectively engage with the exterior rose 128. In other examples, the biasing member 190, 192 can be any other type of resilient/spring member that enables the latch assembly to function as described herein. In an aspect, the two biasing members 190, 192 may be a single integrated component as required or desired. The biasing member 190, 192 when engaged with the exterior rose 128 is configured to at least partially secure the exterior handle 130 and the positioning plate 184 in their respective handedness configuration. Additionally, the biasing member 190, 192 provides the biasing force for the exterior handle 130 and the positioning plate 184 to return to the latched position from the unlatched position. In the example, the biasing members 190, 192 are spaced apart by washers 196 and the entire assembly is secured to the spindle receiver 178 by one or more clips 198, such that the exterior handle 130, the positioning plate 184, and the biasing members 190, 192 are all fixed to one another for rotation around the rotation axis 122 (shown in FIGS. 3 and 4). A washer 196 may also be disposed between the positioning plate 184 and the interior rose 124.

In the example, the exterior rose 128 is a single body component having an open back and an internal cavity. The outside surface of the exterior rose 128 is configured to be mounted against the gate surface and the fasteners 126 are used to secure the exterior rose 128 and the entire exterior assembly 118 to the gate with the operational components captured between the gate surface and inside the rose. In other examples, the exterior rose 128 may be a formed from a two body construction and similar to the interior rose described above.

The exterior rose 128 also include a handedness support 200. The handedness support 200 extends within the exterior rose 128 and is configured to selectively engage with the free end 194 of one of the biasing members 190, 192. In the example, the handedness support 200 is a fastener that couples to the exterior rose 128 and can be removed and reattached as required or desired. In an example, the fastener is a bolt-type component. Additionally, a plate support 202 extends within the exterior rose 128 and is configured to selectively engage with the second end 188 of the positioning plate 184. In the example, the plate support 202 is a fastener that couples to the exterior rose 128 and can be removed and reattached as required or desired. In an aspect, the plate support 202 is selectively attached to the exterior rose 128 for either the left-handed configuration or the right-handed configuration as required or desired.

Figure 11:
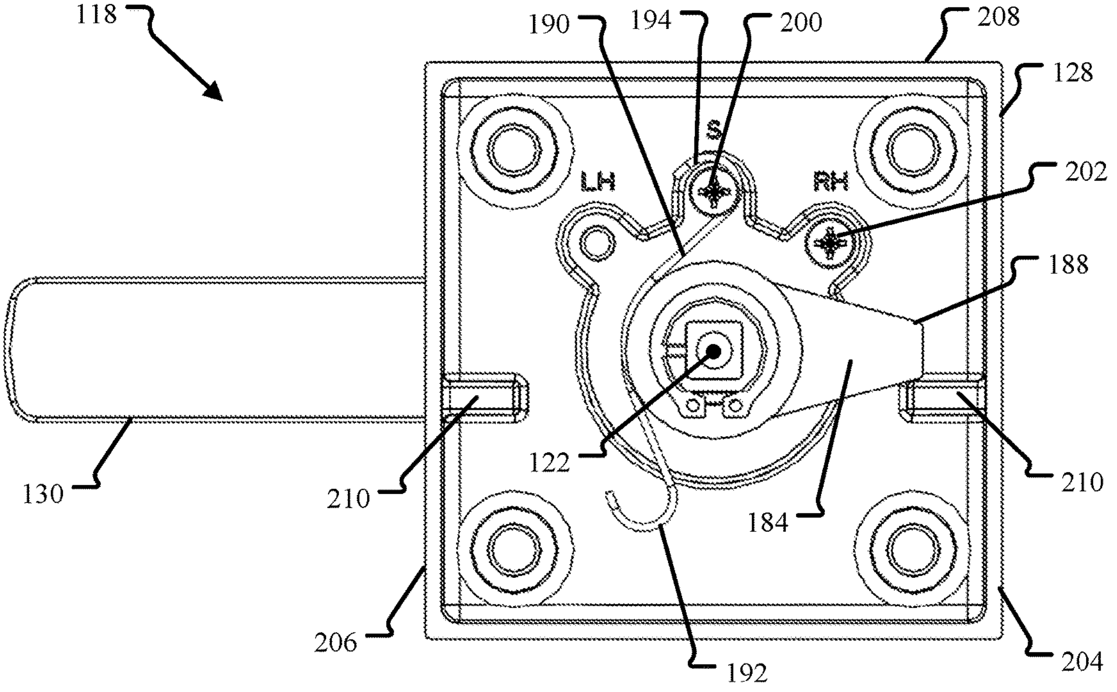
FIG. 11 is an interior view of the exterior assembly of FIG. 10 in a connected right-handed configuration.

FIG. 11 is an interior view of the exterior assembly 118 in a connected right-handed configuration. In the connected right-handed configuration, the positioning plate 184 points toward a left side 204 of the exterior rose 128, while the exterior handle 130 projects from a right side 206. The right and left directions being in the direction of facing the exterior of the rose and looking at the handle. This configuration allows for the exterior assembly 118 to be positioned on the left side of the receiving mechanism 114 (shown in FIGS. 1 and 2) and so that the interior assembly 110 (shown in FIGS. 6-9) can selectively engage therewith. In the assembled latch assembly 100 (shown in FIGS. 3 and 4), the exterior assembly 118 is coupled to the interior assembly 110 via the spindle 120, but the two assemblies are facing opposite directions relative to the rotation axis 122 so that the left and right directions as described as facing the handles are opposite. As illustrated in FIG. 11, the free end 194 of the biasing member 190 is connected to the exterior rose 128 via the handedness support 200 that is coupled to the exterior rose 128.

When the biasing member 190 is connected to the exterior rose 128, the positioning plate 184 is pivotable around the rotation axis 122 (extending in and out of the page) via user operation of the exterior handle 130 between the latched position (as illustrated) and an unlatched position. As used herein, the positioning plate 184 is pivotable between a first position and a second position that corresponds to the latched and unlatched positions of the latch 112 (shown in FIGS. 6-9), and thus, the positioning plate 184 is described as having similar latched/unlatched positions that correspond to the configuration of the latch 112 and without the positioning plate 184 engaging the receiving mechanism 114 (shown in FIGS. 1 and 2). In the unlatched position, the second end 188 of the positioning plate 184 pivots towards a top side 208 of the exterior rose 128 from the latched position (e.g., a counter-clockwise direction as illustrated in FIG. 11). The biasing member 190 biases the positioning plate 184 towards the latched position so that when the exterior handle 130 is released, the positioning plate 184 will automatically return to its horizontal latched position as illustrated (e.g., a clockwise direction as illustrated in FIG. 11). In the example, the other biasing member 192 is not connected to the exterior rose 128.

In the example, the upper and lower pivoting limits, and thereby, the latched and unlatched positions of the positioning plate 184 are at least partially defined by a shoulder 210 defined by the exterior rose 128 and a position of the plate support 202. Both the shoulder 210 and the plate support 202 may extend from the exterior rose 128 and at least a portion of both the shoulder 210 and the plate support 202 are disposed within a plane of the path of travel of the positioning plate 184 as it pivots around the rotation axis 122. This plane that the positioning plate 184 rotates within may be orthogonal to the rotation axis 122 and parallel to the plane that the latch 112 (shown in FIGS. 6-9) moves within. As such, the positioning plate 184 cannot move past the either the shoulder 210 or the plate support 202.

As described herein, the positioning plate 184 and the latch 112 are parallel to one another and are coupled together via the spindle 120. Additionally, the exterior handle 130 and the interior handle 116 are directly coupled together for rotation around the rotation axis 122. As such, rotational movement of the exterior assembly 118 corresponds directly to rotational movement of the interior assembly 110 and vice-versa. Thus, the configuration of the latch assembly 100 allows the handles, the latch and the positioning plate, and the biasing members to all corporate with one another to drive operation of the latch assembly and performance thereof.

From the connected right-handed configuration described above in FIG. 11, if the user requires or desires the positioning plate 184 to point towards the right side 206 and in a left-handed configuration, the exterior assembly 118 is configured for such a change and without substantial disassembly of the positioning plate 184 and handle 130 components and similar to the interior assembly 110 described above. The biasing member 190 is disconnected from the handedness support 200 and the exterior rose 128. In the example, the handedness support 200 is completely removed from the exterior rose 128. Additionally, the plate support 202 is similarly removed from the exterior rose 128. Once the biasing member 190 is disconnected, the handle 130, the positioning plate 184, and the biasing members 190, 192 assembly are freely rotatable around the rotation axis 122. However, this assembly is still mounted to the exterior rose 128 such that complete disassembly is not needed.

In the example, both biasing members 190, 192 are rotatable around the rotation axis 122 when one is not engaged with the exterior rose 128. Additionally, once the handedness support 200 and plate support 202 are removed from the plane of the path of travel of the positioning plate 184, the positioning plate 184 is freely rotatable relative to the exterior rose 128. In an aspect, disconnecting the biasing member 190 does not axially move the positioning plate 184 along the rotation axis 122. As such, the plane (e.g., the plane that the positioning plate 184 is disposed within and orthogonal to the rotational axis) that the positioning plate 184 pivots in between the latched and unlatched positions is the same plane that the positioning plate 184 can rotate in for movement between the left- and right-handed configurations. This also simplifies and makes more efficient the steps required to change the handing configuration of the exterior assembly 118.

The exterior rose 128 has two shoulders 210 that extend within the rotation plane of the positioning plate 184. As such, from the right-handed configuration illustrated in FIG. 11, the positioning plate 184 can only rotate towards the top side 208 of the exterior rose 128 until the shoulder 210 adjacent the right side 206 is reached (e.g., in a counter-clockwise direction as illustrated in FIG. 11) and when the biasing members 190, 192 are disconnected. However, if the shoulders 210 are not present, the positioning plate 184 and handle 130 assembly would be able to freely rotate 360° around the rotation axis 122.

Figure 12:
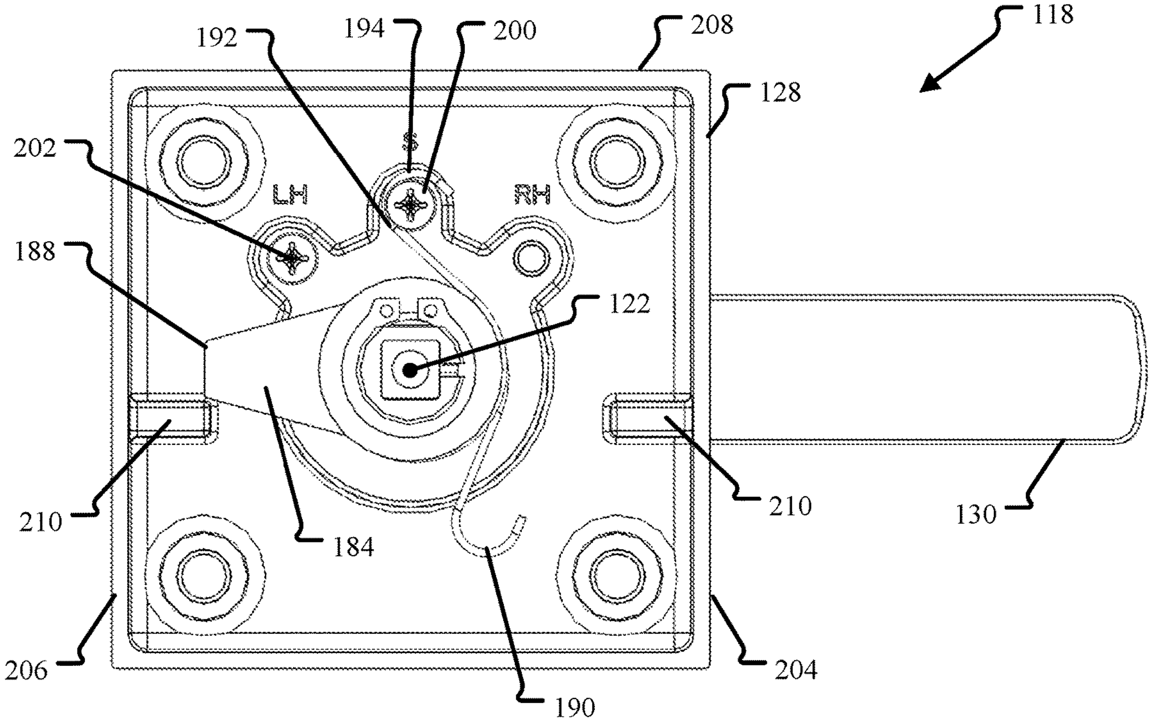
FIG. 12 is an interior view of the exterior assembly of FIG. 10 in a connected left-handed configuration.

FIG. 12 is an interior view of the exterior assembly 118 in a connected left-handed configuration. In the connected left-handed configuration, the positioning plate 184 points towards the right side 206 of the exterior rose 128, while the exterior handle 130 projects from the left side 204 and this position is secured via the biasing member 192 connecting to the exterior rose 128. As illustrated in FIG. 12, the free end 194 of the biasing member 192 is connected to the exterior rose 128 via the handedness support 200. In both the left-handed configuration and the right-handed configuration (described above), the location of the handedness support 200 is the same with respect to the exterior rose 128.

When the biasing member 192 is connected to the exterior rose 128, the positioning plate 184 is pivotable around the rotation axis 122 (extending in and out of the page) via user operation of the exterior handle 130 between the latched position (as illustrated) and the unlatched position. In the unlatched position, the second end 188 of the positioning plate 184 pivots towards the top side 208 of the exterior rose 128 from the latched position (e.g., in a clockwise direction as illustrated in FIG. 12). The biasing member 192 biases the positioning plate 184 towards the latched position so that when the exterior handle 130 is released, the positioning plate 184 will automatically return to its horizontal latched position as illustrated. In the example, the other biasing member 190 is not connected to the exterior rose 128.

In the example, the upper and lower pivoting limits, and thereby, the latched and unlatched positions of the positioning plate 184 are at least partially defined by the shoulder 210 defined by the exterior rose 128 and the position of the plate support 202. In the left-handed configuration, the plate support 202 is moved to the opposite side of the handedness support 200 as described above and the right-handed configuration. In an aspect, the exterior rose 128 may include indicia for the position of the supports 200, 202. Both the shoulder 210 and the plate support 202 may extend from the exterior rose 128 and at least a portion of both the shoulder 210 and the plate support 202 are disposed within a plane of the path of travel of the positioning plate 184 as it pivots around the rotation axis 122. As such, the positioning plate 184 cannot move past the either the shoulder 210 or the plate support 202.

Figure 13:
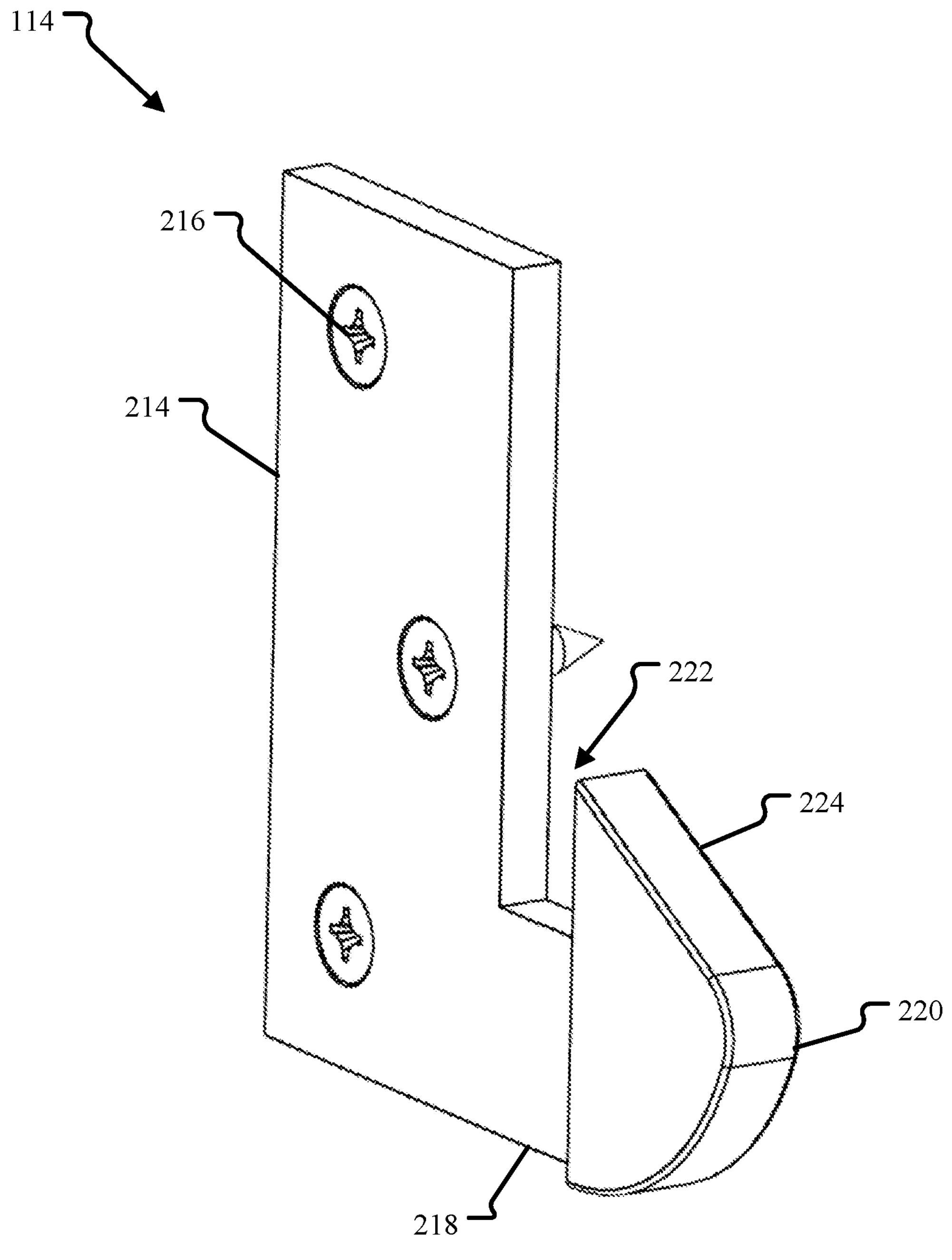
FIG. 13 is a perspective view of a receiving mechanism.

FIG. 13 is a perspective view of the receiving mechanism 114. The receiving mechanism 114 is configured to be mounted on the gate jamb and engage with the second end of the latch 112 (shown in FIGS. 3 and 4) when the latch 112 is in the latched position. In the example, the receiving mechanism 114 includes a plate 214 having one or more fasteners 216 (e.g., screws) so that the receiving mechanism 114 can be mounted on the gate jamb. A leg 218 extends from the plate 214 and has a nose 220 coupled thereto. The leg 218 and the nose 220 at least partially form a notch 222 that receives the latch 112 and which can secure the gate in a closed position. The nose 220 also includes a tapered portion 224 so that the latch 112 can automatically slide into the notch 222 when the gate is being closed.

Figure 14:
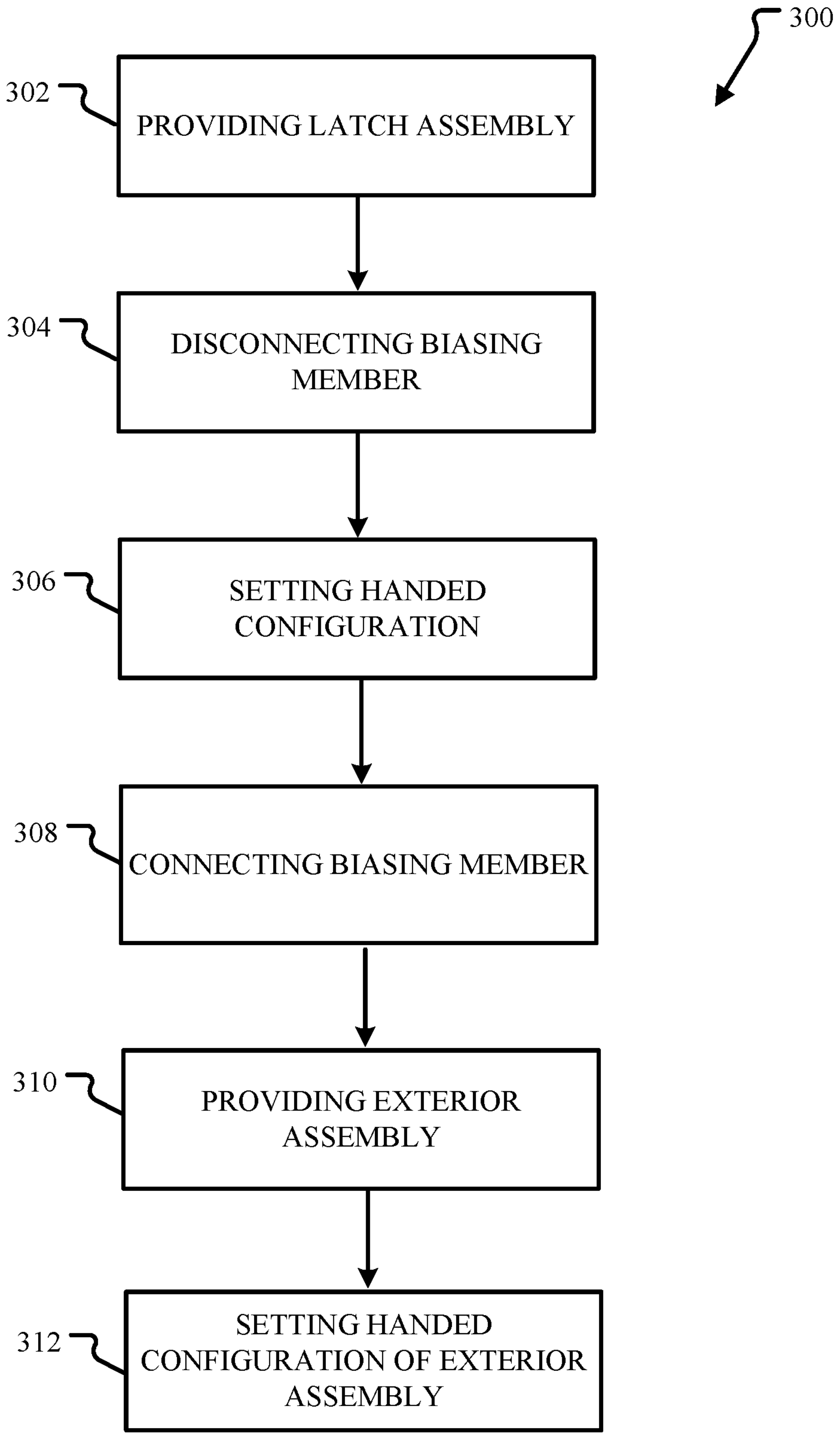
FIG. 14 is a flowchart illustrating a method of handing a latch assembly.

FIG. 14 is a flowchart illustrating a method 300 of handing a latch assembly. The method 300 begins with providing a latch assembly (operation 302). In the example, the latch assembly is the same or similar to the latch assembly 100 described above and has a biasing member selectable connectable to a rose. Accordingly, the method 300 includes, disconnecting the biasing member from the rose (operation 304). When the biasing member is disconnected from the rose, a handle and a latch are rotatable together around a rotation axis between at least a left-handed configuration and a right-handed configuration of the latch assembly. In some examples, disconnecting the biasing member from the rose includes removing a fastener that connects the biasing member to the rose. In another example, disconnecting the biasing member from the rose includes removing a first body of the rose from a second body of the rose.

Once the biasing member is disconnected, the handed configuration of the handle and the latch is set (operation 306), and the biasing member is connected back to the rose (operation 308) so as to secure the handed configuration of the latch assembly. In some aspects, the latch is part of an interior assembly, and the method further includes providing an exterior assembly (operation 310) and setting a handed configuration of the exterior assembly (operation 312).

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed:

1. A latch assembly comprising:

a rose;

a handle rotatably coupled to the rose and rotatable around a rotation axis;

a latch including a first end and an opposite second end, the first end disposed within the rose and coupled to the handle, and the second end extending outwards from the rose; and at least one biasing member disposed within the rose and engaged with the first end of the latch, the at least one biasing member selectively connectable to the rose, wherein when the at least one biasing member is connected to the rose, the latch is pivotable relative to the rose around the rotation axis between a latched position and an unlatched position via the handle, the latch being biased towards the latched position, wherein when the at least one biasing member is disconnected from the rose, the handle and the latch are rotatable together relative to the rose around the rotation axis between at least a left-handed configuration and a right-handed configuration, the at least one biasing member connecting to the rose to secure the handle and the latch in either the left-handed configuration or the right-handed configuration, and wherein the latch pivots along an axial plane relative to the rotation axis between the latched position and the unlatched position that is the same axial plane that the latch rotates along between the left-handed configuration and the right-handed configuration.

2. The latch assembly of claim 1, wherein the at least one biasing member is rotatable around the rotation axis when disconnected from the rose.

3. The latch assembly of claim 1, further comprising a support removably coupled to the rose, the at least one biasing member selectively connecting to the rose via the support.

4. The latch assembly of claim 1, wherein the rose defines a pair of opposing openings each corresponding to the left- and right-handed configuration of the latch such that the latch extends therethrough, and wherein the respective opening at least partially defines the latched position and the unlatched position of the latch.

5. The latch assembly of claim 1, wherein the rose includes a first body and a second body, the first body and the second body removably coupled together.

6. A latch assembly comprising:

a spindle rotatable around a rotation axis;

an interior assembly comprising:

an interior rose defining two opposing openings and including a first body and a second body;

a handedness support disposed within the interior rose;

an interior handle mounted to the first body and rotatable around the rotation axis, the interior handle coupled to the spindle;

a latch having a first end and an opposite second end, the first end disposed within the interior rose and coupled to the interior handle, and the second end extending outwards from the interior rose; and at least one interior biasing member disposed within the interior rose and engaged with the first end of the latch, wherein the at least one interior biasing member is selectively connectable to the handedness support, wherein when the at least one interior biasing member is connected to the handedness support, the latch extends through one of the two opposing openings and is pivotable relative to the interior rose around the rotation axis between a latched position and an unlatched position at least partially defined by the opening, the latch being biased towards the latched position, wherein when the at least one interior biasing member is disconnected from the handedness support and the second body is removed from the first body, the interior handle and the latch are rotatable together relative to the interior rose around the rotation axis between at least a left-handed configuration and a right-handed configuration, the at least one interior biasing member connecting to the handedness support to secure the interior handle and the latch in either the left-handed configuration or the right-handed configuration, and wherein the pivoting movement of the latch between the latched and unlatched positions occurs on a same axial plane relative to the rotation axis as that of the rotational movement of the latch between the left- and right-handed configurations; and an exterior assembly comprising:

an exterior rose;

an exterior handle mounted to the exterior rose and rotatable around the rotation axis, the exterior handle coupled to the spindle, wherein both the interior handle and the exterior handle drive movement of the latch between the latched position and the unlatched position.

7. The latch assembly of claim 6, wherein the exterior assembly further comprises:

a positioning plate disposed within the exterior rose and coupled to the exterior handle; and at least one exterior biasing member disposed within the exterior rose and engaged to the positioning plate, wherein the at least one exterior biasing member is selectively connectable to the exterior rose, wherein when the at least one exterior biasing member is connected to the exterior rose, the positioning plate is pivotable around the rotation axis between a first position and a second position, the positioning plate being biased towards the first position, and wherein when the at least one exterior biasing member is disconnected from the exterior rose, the exterior handle and the positioning plate are rotatable together around the rotation axis between at least a left-handed configuration and a right-handed configuration, the at least one exterior biasing member connecting to the exterior rose to secure the exterior handle and the positioning plate in either the left-handed configuration or the right-handed configuration.

8. The latch assembly of claim 7, wherein the first position and the second position of the positioning plate correspond to the latched position and the unlatched position, respectively, of the latch.

9. The latch assembly of claim 7, wherein the first position is defined by at least one shoulder formed by the exterior rose and the second position is defined by a repositionable plate support coupled to the exterior rose.

10. The latch assembly of claim 7, wherein the pivoting movement of the positioning plate between the first and second positions occurs on a same plane as that of the rotational movement of the positioning plate between the left- and right-handed configurations.

11. The latch assembly of claim 6, wherein the handedness support extends through the plane of movement of the latch.

12. The latch assembly of claim 6, wherein the at least one interior biasing member includes a pair of tension springs, a first of the pair of tension springs coupled between the latch and the handedness support in the left-handed configuration and a second of the pair of tension springs coupled between the latch and the handedness support in the right-handed configuration.

13. The latch assembly of claim 6, wherein the left-handed configuration is approximately 180° from the right-handed configuration.

14. The latch assembly of claim 6, wherein when the at least one interior biasing member is disconnected from the handedness support and the second body is removed from the first body, the interior handle and the latch are freely rotatable together around the rotation axis.

15. The latch assembly of claim 6, further comprising a receiving mechanism configured to engage the second end of the latch when the latch is in the latched position.

16. A method of handing a latch assembly comprising:

providing a latch assembly including:

a rose;

a handle rotatably coupled to the rose and rotatable around a rotation axis;

a latch including a first end and an opposite second end, the first end disposed within the rose and coupled to the handle, and the second end extending outwards from the rose; and at least one biasing member disposed within the rose and coupled between the latch and the rose, wherein the latch is pivotable relative to the rose around the rotation axis between a latched position and an unlatched position via the handle, the latch being biased towards the latched position;

disconnecting the at least one biasing member from the rose such that the handle and the latch are rotatable together relative to the rose around the rotation axis between at least a left-handed configuration and a right-handed configuration, wherein the latch pivots along an axial plane relative to the rotation axis between the latched position and the unlatched position that is the same axial plane that the latch rotates along between the left-handed configuration and the right-handed configuration;

setting the handed configuration of the handle and the latch; and connecting the at least one biasing member to the rose.

17. The method of claim 16, wherein disconnecting the at least one biasing member from the rose includes removing a fastener that connects the at least one biasing member to the rose.

18. The method of claim 16, wherein disconnecting the at least one biasing member from the rose includes removing a first body of the rose from a second body of the rose.

19. The method of claim 16, wherein the rose, the handle, the latch, and the at least one biasing member are included in an interior assembly, the method further comprising:

providing an exterior assembly couplable to the interior assembly by a spindle, the exterior assembly including:

an exterior rose; and an exterior handle; and setting a handed configuration of the exterior assembly to match the interior assembly.

* * * * *